June 4, 1974  J. N. CALVIN  3,814,666
STAGGERED CONE DEFLECTORS
Filed Jan. 4, 1971
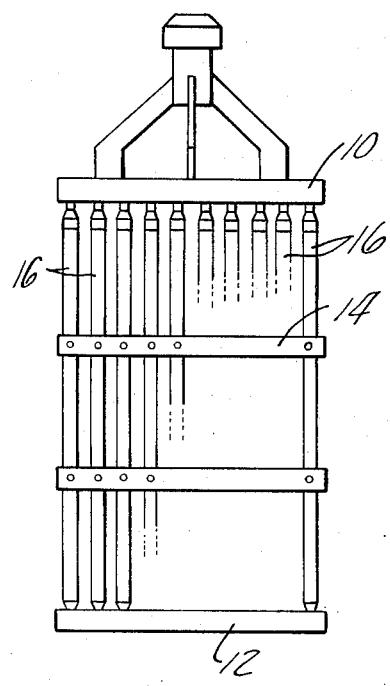
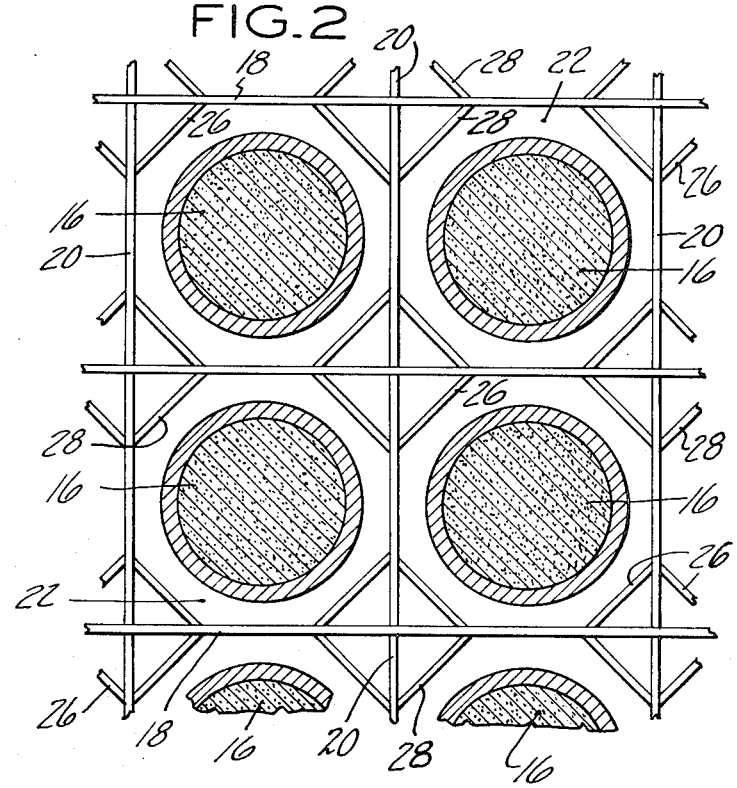
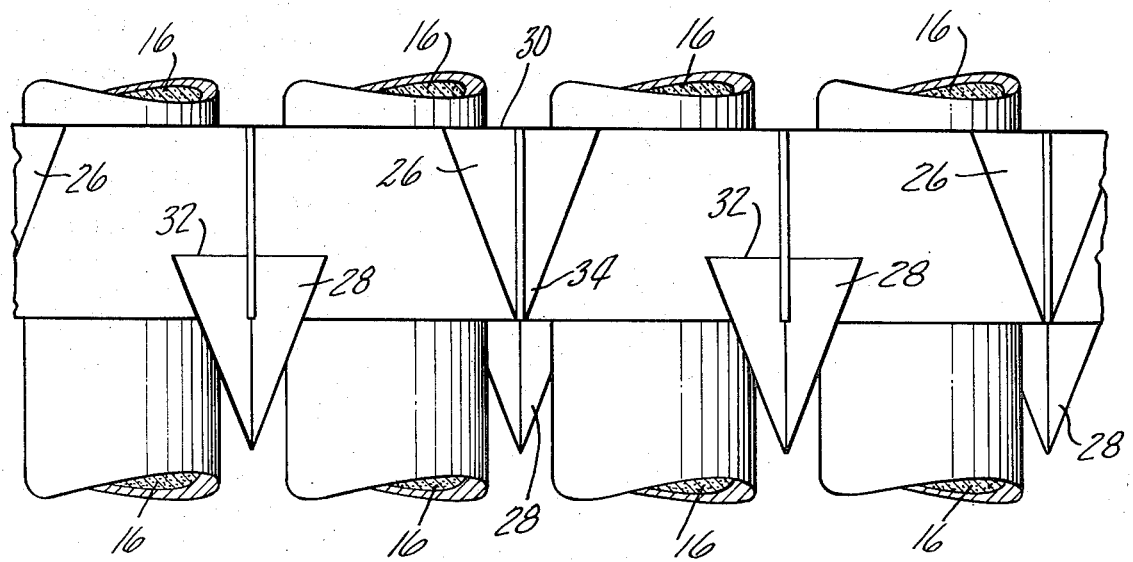
INVENTOR
JOHN N. CALVIN United States Patent Office 3,814,666
Patented June 4, 1974

3,814,666
STAGGERED CONE DEFLECTORS
John N. Calvin, West Simsbury, Conn., assignor to Combustion Engineering, Inc., Windsor, Conn.
Filed Jan. 4, 1971, Ser. No. 103,451
The portion of the term of the patent subsequent to May 16, 1989, has been disclaimed
Int. Cl. G21c 3/34
U.S. Cl. 176—78                                                 14 Claims

ABSTRACT OF THE DISCLOSURE

A flow deflector for cooling fluid flowing longitudinally in channels between spaced parallel nuclear fuel reactor elements positioned laterally by intersecting grid elements. The deflector comprises a plurality of cones positioned at the intersection of said grid elements with their apexes pointed upstream to deflect the flow laterally toward and across the fuel elements and arranged in spaced staggered relation at different elevations on the grid to reduce flow resistance.

BACKGROUND OF THE INVENTION

The fuel or fissionable material for nuclear reactors is conventionally in the form of fuel elements or rods which are in turn grouped together in the reactors in bundles comprising fuel element assemblies. An elongated support means in the fuel assembly is provided to vertically support the fuel elements or rods. A plurality of longitudinally spaced grids extends across and are secured to elongated support means. The fuel rods, in turn, extend in a parallel array through openings in the grids and are vertically supported by the bottom end portion of the support means. Each grid has means for laterally positioning the fuel rods. Each reactor has a number of such fuel element assemblies therein comprising the reactor core. The liquid moderator-coolant, normally water, flows upwardly through the reactor core in the channels between the fuel elements to remove heat. Reference may be made to U.S. Pat. No. 3,379,619 for a more detailed showing of a typical assembly.

One of the operating limitations on current reactors is established by the onset of film boiling on the surfaces of the fuel elements. This phenomena is commonly described qualitatively as departure from nucleate boiling (DNB) and quantitatively in terms of the amount of heat flux existing when the DNB occurs (critical heat flux or CHF). This condition is affected by the fuel element spacing, the system pressure, the heat flux, the coolant enthalpy and the coolant velocity. When DNB occurs, there is a rapid rise in the temperature of the adjacent fuel element due to the reduced heat transfer which could result in a failure of the element. Therefore, in order to maintain a factor of safety, the reactor must be operated a certain margin below the CHF and the point at which DNB occurs. This margin is referred to as the "thermal margin."

Nuclear reactors normally have regions in the core which have a higher neutron flux and power density than other regions. This may be caused by a number of factors, one of which is the presence of control rod channels in the core. When the control rods are withdrawn, the control rod channels are filled with moderator which increases the local moderating capacity and thereby increases the power generated in the adjacent fuel. In these regions of high power density, known as "hot channels," there is a higher rate of coolant enthalpy rise than in other channels. It is such hot channels that set the maximum operating condition for the reactor and limit the amount of power that can be generated since it is in these channels that the critical thermal margin would be reached first.

SUMMARY OF THE INVENTION

It has been found that coolant flow inclined to the fuel elements will result in a higher value for the critical heat flux probably because such flow inhibits the formation of steam bubbles and superheated water layers or voids which are found to exist over the fuel element surface just prior to DNB in the presence of parallel flow. It has also been found that mixing vanes or flow deflectors placed in the coolant flow channels of a reactor core will mix coolant from various channels and thus tend to reduce the effect of hot channels. The mixing lowers the high coolant enthalpy rise in the hot channels and tends to average out the enthalpy rise over the entire core cross section. Both effects mean that the reactor can be operated at a higher power level and still maintain a safe thermal margin.

A disadvantage of the deflectors is that they form an obstruction to the free flow of cooling fluid and cause an increase in pressure drop through the reactor. In order to minimize this adverse effect of the deflectors, the deflector cones in the present invention are arranged on two levels so that the maximum transverse area of the deflectors are at different levels and the consequent restriction in the flow area through the reactor is less than it would be if the deflectors were all placed at the same level.

It is therefore an object of the present invention to provide a novel arrangement of coolant flow deflectors in the reactor core.

Another object of the invention is to provide flow deflectors which will effectively cause disturbance of the coolant flow adjacent the surface of the fuel elements as well as cause mixing of the coolant from various channels with a minimum of flow resistance to the coolant fluid.

Briefly, the objects of the invention are accomplished by providing coolant flow deflectors generally of a conical or pyramidal shape arranged in staggered relation and at different elevations such that the flow will be diverted from the centers of the flow channels up against or towards the adjacent fuel elements while providing a minimum of flow resistance through the flow channels.

Even more specifically, the flow deflectors are supported in the intersections of a grid, which may also serve as a support grid for the fuel elements, and are alternately located adjacent the top edge and adjacent the bottom edge of the grid structure.

These and other objects and advantages of the present invention will become apparent when considered in view of the following detailed description and the annexed drawings.

BRIEF DESCRIPTION OF THE DRAWINGS

FIG. 1 is an elevation view of a fuel assembly including grids on which the flow deflectors of this invention are mounted.

FIG. 2 is a plan view showing the grid structure with the deflectors positioned thereon and the fuel rods passing through openings in the grid structure.

FIG. 3 is a side view partially in section showing the deflectors mounted on the grid structure at different elevations.

DESCRIPTION OF THE PREFERRED EMBODIMENT

A nuclear fuel assembly may comprise an upper end fitting 10 connected with a lower end fitting 12 by elongated supports or thimbles (not shown). Between the two fittings may be a plurality of spaced grids 14 which may be secured to the supports or thimbles to hold them in position. Fuel rods 16 may be inserted through the upper fitting and through openings or passageways in the grid and down onto the lower end fitting which supports them. The spaced fuel rods 16 define channels between the rods through which a cooling fluid, which may be water and may be pressurized, is forced. The core of a nuclear reactor is formed from a plurality of such fuel assemblies and it is in such assemblies that the coolant flow deflectors of the present invention are incorporated. The reactor coolant flows up through apertures in the lower end fitting 12, through passageways 22 and upwardly along the elongated fuel elements 16 and out through the upper end fitting 10. The spacer grids are made up of grid strips 18 and 20 which intersect in the coolant flow channels 24 and the coolant flow unless disturbed will be generally parallel to the elongated fuel rod. It is this upward parallel coolant flow through the fuel assemblies which is disturbed and deflected by the deflectors of this invention.

The coolant flow deflectors are mounted on the spacer grids 14 preferably at the intersection of the grid strips 18 and 20. The spacer grids are located at intervals along the length of the fuel assembly as shown in FIG. 1. These grids may be for the sole purpose of supporting the deflectors as shown in FIG. 2 or they may be for the additional purpose of spacing and holding the fuel elements.

FIG. 2 illustrates a plurality of fuel rods 16 located or passing through openings or passageways 22 in the grid 14 formed of intersecting grid strips 18 and 20. These grid strips 18 and 20 intersect at approximately the center of a channel indicated generally at 24 and defined by the four surrounding fuel rods 16. The flow deflectors 26 and 28 are mounted on the grid strips at the intersection of the strips. The deflectors 26 and 28 are substantially identical with the exception that the deflector 26 is located at the upper, downstream, side and the deflector 28 is located at the lower, upstream, side of a grid strip. The reason for having two different levels of deflectors will become apparent as the specification proceeds.

As shown in FIG. 1 the grid strips may be generally straight thin intersecting metal strips intermeshed in the manner used in the egg separators in an egg crate in which all the strips running in one direction are slotted downwardly from the upper edge about half their width to receive the strips running in the other direction and the strips running in that other direction are slotted upwardly from the bottom about half their width to receive the strips running in the one direction. Such a structure will provide a grid of intersecting and interengaging grid strips. The grid strip 18 may thus be assembled with the grid strip 20 by pushing the grid strip 18 downwardly through the slots in the grid strip 20. The grid strips may be unslotted and may be secured together in any other desired manner, as by welding for instance.

FIGS. 2 and 3 illustrate several fuel elements 16 and upper deflectors 26 and lower deflectors 28 mounted on a grid structure shown generally at 14 formed of members 18 and 20. The deflectors are generally pyramidal in shape and deflect the coolant flow from the center of the flow channels shown generally at 24 between four fuel elements outwardly toward the fuel elements. This flow deflection has two primary effects. First, the flow deflection disrupts the coolant flow condition immediately adjacent the surface of the individual fuel elements. This tends to eliminate any DNB condition. There is a gradual change from nucleats to stable film boiling rather than a steep change. The critical heat flux is increased and it is even difficult to detect the critical point due to the gradual change in boiling characteristics. Second, the flow deflection tends to cause the coolant flowing upward in any particular flow channel between the fuel elements to be mixed with the coolant flow in adjacent and even more remote channels. This has the effect of evening out differences in coolant temperatures between various channels.

The deflectors may be of any desired tapered shape which will be defined herein as conical. Although the deflectors could be for example a right cylinder cone, the preferred conical shape is the generally pyramidal shape shown in the drawing. The pyramid deflectors shown may be of solid construction or made of sheet metal and may be slotted in the manner shown in my application Ser. No. 889,548, filed Dec. 31, 1969 for "Flow Deflector for Nuclear Fuel Element Assemblies," so as to be supported upon the grid strips 18 and 20 or the deflectors may be supported upon the grid strips by any other suitable means such as welding. The lower end of the deflectors need not come to a sharp point and may be truncated.

As shown in FIG. 3 the upper cone 26 is located with its base 30 adjacent the upper edge of the grid and the lower cone 28 is positioned with its base within the grid strip openings adjacent the lower edge of the grid strip and preferably about one third of the width of the grid strip from the lower edge of the grid strip. Deflector 28 is positioned upstream of the deflector 26 so that the bases of the two deflectors will be separated along the line of flow of cooling fluid so as to provide a flow path through the opening or passageway 22 of greater cross sectional area than would be provided if they were positioned at the same level. The maximum flow area would be provided by positioning the base 32 at about the same upstream position as the apex 34 of the upper deflector 26. Other positions in which the base of deflector 28 is positioned upstream of the midheight of the deflector 26 and downstream of the apex 34 may be found satisfactory. If the apex 34 of the upper deflector 26 is positioned within the grid 14 upstream of the lower edge of the grid strip it may be found convenient and satisfactory to position the base 32 of the lower grid strip 28 entirely upstream of the apex 34 which would of course give the maximum flow area through the grid passageway.

As shown in FIG. 2 one set of deflectors namely the upper deflectors 26 are positioned in alternate flow channels and the other set of deflectors, the lower deflectors 28, are positioned in flow channels adjacent thereto so that each passageway 22 in the grid strip is provided with portions of two deflectors 26 and portions of two deflectors 28 thus providing each of the four corners of the boundary of the passageway 22 with a deflector with two of the deflectors positioned downstream of the other two.

As shown in FIG. 3 each grid strip is wider than half the length of a deflector and is preferably at least as wide as the length of a deflector so that the upstream deflector can be mounted adjacent the lower or upstream edge of the grid strip with a desired limited overlap of the deflectors in the direction of the cooling stream flow. With the arrangement shown in FIG. 3 it should be noted that the upstream cone 28 extends upstream into the channel 24 beyond the upstream edge of the grid strip 14 although if desired and the relative width of the grid strip and the length of the deflectors were properly proportioned the upstream cone 28 might be entirely within the grid strip passageway.

As shown in FIG. 2 the grid strips 18 and 20 divide the channel 24 at the intersection of the grid strips into quarters and the deflectors 26 and 28 positioned at the intersections provide a deflecting surface in each one of the four quarters. With a conical deflector in each of the four channels 24 surrounding any selected fuel rod 16 a deflector will be provided in each of the four corners of the passageway 22. If desired to put deflectors into any one selected passageway 22 to cool any one selected rod 16 without putting deflectors into adjacent passageways, it is of course possible to use only a portion of each deflector 26 and 28 utilizing that portion in the selected passageway 22 to thus provide for that particular passageway deflector surfaces positioned within the passageway and extending widthwise of the grid strips and inclined from adjacent said grid strips outward in a downstream direction so as to project into said passageways and the cooling flow stream and direct the fluid flow away from said corners toward the center of said passageway and against the adjacent fuel rod 16.

As shown in FIG. 2 in spacing the deflectors 28 at alternate intersections they are positioned on diametrically opposite sides of the fuel rod 16. However, it is possible to position the deflectors 28 at alternate intersections in one direction and at adjacent intersections in the other direction and thus place both deflectors 28 on the same side of the fuel rod 16 with the two downstream deflectors adjacent any selected fuel rod positioned on the opposite side of that fuel rod.

It will be understood that the deflectors shown and described herein are merely illustrative and that changes may be made without departing from the spirit and scope of the invention as claimed.

What is claimed is:

1. A nuclear fuel assembly adapted to have a coolant flow in one direction therethrough comprising a plurality of longitudinally extending fuel elements forming adjacent longitudinally extending coolant flow channels therebetween, a grid comprising cross members intersecting in said channels and defining passageways through which individual fuel elements extend, deflector cones, each including a base, an apex and deflecting surfaces therebetween located at a grid intersection in said flow channels with their apexes pointed upstream of said coolant flow, said deflecting surfaces supported in said passageways and arranged in two groups, one group positioned in alternate channels and the other group positioned upstream of but adjacent to the deflectors of said one group in flow channels adjacent to said alternate channels, said grid supporting said deflectors in position.

2. A fuel assembly as claimed in claim 1 in which the deflectors of said one group are positioned on diametrically opposite sides of said elements.

3. A nuclear reactor fuel assembly as claimed in claim 1 in which the deflecting surfaces of the upstream cones deflect the coolant flow outwardly from its associated adjacent channel generally toward an adjacent fuel element and the apex of the adjacent downstream cone and the adjacent downstream cone deflects the coolant flow in its associated passageway and the flow received from the upstream cone outwardly toward said adjacent fuel element.

4. A nuclear reactor fuel assembly as claimed in claim 1 in which the base of the upstream cone is positioned downstream of the apex of the downstream cone and upstream of the base of the downstream cone.

5. A nuclear reactor fuel assembly as claimed in claim 4 in which the base of the upstream cone is positioned upstream of the mid height of the downstream cone.

6. A nuclear reactor fuel assembly as claimed in claim 1 in which the supporting means comprises a grid formed of intersecting cross members, the downstream cones attached to said grid with their bases adjacent the downstream portion of said members and the upstream cones attached to said grid with their bases adjacent the upstream portion of said members so that the deflector cones are spaced longitudinally.

7. A grid comprising intersecting cross members defining passageways through said grid having an upstream edge and a downstream edge and supporting flow deflectors having flow deflector surfaces in said passageways at the intersections of said cross members for deflecting fluid flow in passing through said passageways, said deflectors comprising two sets of cones each cone having a base, an apex and deflector surfaces extending transversely of said passageways between said base and said apex with the apexes pointed upstream, one set of cones located at alternate intersections with deflector surfaces in one passageway and the other set positioned downstream of said one set with deflector surfaces in the same passageway and at intersections different from but adjacent to the intersections supporting said one set.

8. A grid as defined in claim 7 in which the cones of said one set are positioned at intersections located diagonally across said openings.

9. A grid as claimed in claim 7 in which said cross members define four quadrants at each intersection and the cones are generally pyramidal in shape having a square base and four similar deflecting side wall surfaces, said side wall surfaces facing outwardly from an intersection with a surface in each quadrant.

10. A grid as claimed in claim 7 in which the deflectors of said other set extend from said downstream edge into said passageways in said grid and the deflectors of said one set extend upstream, from adjacent said upstream edge, beyond the upstream edge of said grid.

11. A grid as claimed in claim 7 in which the base of the upstream cone is positioned entirely upstream of the mid height of the downstream cone.

12. A grid for a nuclear reactor assembly having elongated fuel rods, comprising intersecting cross members defining passageways through said grid for receiving said fuel rods and coolant flow and having an upstream edge, a downstream edge, a width between said edges and supporting fluid flow deflectors in said passageways at the intersections of said members for deflecting fluid flow passing through said passageways, said deflectors comprising deflector surfaces positioned in a passageway, extending widthwise of said members and inclined outward from adjacent said cross members, in a downstream direction, so as to project transversely into said passageway, the downstream ends of said deflectors spaced circumferentially in said passageway with at least some deflector downstream ends located at different downstream positions across the width of said grid.

13. A grid as claimed in claim 12 in which the deflector surfaces are of substantially the same length.

14. A grid as claimed in claim 12 in which the boundary of a passageway has four corners and a deflector surface is positioned in each corner with two of the deflectors positioned downstream of the other two.

References Cited

UNITED STATES PATENTS

| | | | |
|---|---|---|---|
| 3,393,128 | 7/1968 | Obertelli et al. | 176—78 |
| 3,379,619 | 4/1968 | Andrews et al. | 176—76 X |
| 3,395,077 | 7/1968 | Tong et al | 176—78 |
| 3,439,737 | 4/1969 | Boorman et al. | 176—78 X |
| 3,663,367 | 5/1972 | Calvin | 176—78 |

CARL D. QUARFORTH, Primary Examiner

E. E. LEHMANN, Assistant Examiner

U.S. Cl. X.R.

176—76· 239—500